(12) United States Patent
Graham (10) Patent No.: US 9,140,962 B2
(45) Date of Patent: Sep. 22, 2015

(54) CAMERA MOUNT

(71) Applicant: Brent Williams Graham, Austin, TX (US)

(72) Inventor: Brent Williams Graham, Austin, TX (US)

(*) Notice: Subject to any disclaimer, the term of this patent is extended or adjusted under 35 U.S.C. 154(b) by 0 days.

(21) Appl. No.: 14/526,354

(22) Filed: Oct. 28, 2014

(65) Prior Publication Data

US 2015/0137544 A1  May 21, 2015

Related U.S. Application Data

(60) Provisional application No. 61/906,146, filed on Nov. 19, 2013.

(51) Int. Cl.
*G03B 17/56* (2006.01)
(52) U.S. Cl.
CPC ............ *G03B 17/563* (2013.01); *G03B 17/561* (2013.01)
(58) Field of Classification Search
CPC ............................ G03B 17/563; G03B 17/561
See application file for complete search history.

(56) References Cited

U.S. PATENT DOCUMENTS

| | | |
|---|---|---|
| 3,966,101 A | 6/1976 | Taylor, III |
| 4,091,975 A | 5/1978 | Russell, Jr. |
| 4,158,490 A | 6/1979 | Gottschalk et al. |
| 4,208,028 A | 6/1980 | Brown et al. |
| 4,244,500 A | 1/1981 | Fournier |
| 4,327,986 A | 5/1982 | Carter |
| 4,394,075 A | 7/1983 | Brown et al. |
| 4,526,308 A | 7/1985 | Dovey |
| 4,542,966 A | 9/1985 | Knaudt |
| 4,692,807 A | 9/1987 | Kee |
| 4,802,612 A | 2/1989 | Anderson |
| 4,895,286 A | 1/1990 | DeRosa |
| 4,943,820 A | 7/1990 | Larock |
| 4,963,904 A | 10/1990 | Lee |
| 4,991,758 A | 2/1991 | Eaneff |
| 5,064,109 A | 11/1991 | Caster |
| 5,073,788 A | 12/1991 | Lingwall |
| 5,111,983 A | 5/1992 | Simmons et al. |
| 5,424,791 A | 6/1995 | Campbell |
| 5,598,963 A | 2/1997 | Buswell |
| 5,612,756 A | 3/1997 | Kardach |
| 5,742,859 A | 4/1998 | Acker |
| 5,787,317 A | 7/1998 | Robinson |
| 6,056,449 A | 5/2000 | Hart |
| 6,336,576 B1 | 1/2002 | Easter |
| 6,601,999 B1 | 8/2003 | McTeer |
| 6,764,231 B1 | 7/2004 | Shubert |
| 6,899,255 B2 | 5/2005 | Pringle |
| 6,929,409 B2 | 8/2005 | DeSorbo et al. |
| 7,000,879 B2 | 2/2006 | Gonzales |
| 7,293,924 B2 | 11/2007 | DeSorbo et al. |
| 7,318,678 B2 | 1/2008 | DeSorbo et al. |
| 7,372,502 B2 | 5/2008 | Gonzalez |
| 7,488,126 B2 | 2/2009 | Gonzales |
| 7,665,698 B2 | 2/2010 | DeSorbo et al. |
| 7,683,969 B2 | 3/2010 | Callahan |
| 7,922,401 B2 | 4/2011 | McKay |
| 8,276,242 B2 | 10/2012 | Girard et al. |
| 8,328,359 B2 | 12/2012 | Monroe et al. |

(Continued)

*Primary Examiner* — WB Perkey
(74) *Attorney, Agent, or Firm* — Pierson IP, PLLC (57) ABSTRACT

Embodiments disclose systems and methods for a camera mount. Specifically, embodiments are directed towards a camera support that may be quickly unlocked and rotated, so that the grip orientation changes from a normal hand-grip use, to an orientation that can be undergirded by the crook of the operators elbow.

20 Claims, 7 Drawing Sheets

(56) References Cited

U.S. PATENT DOCUMENTS

| | | | |
|---|---|---|---|
| 2007/0292125 A1* | 12/2007 | Saxton | 396/420 |
| 2010/0266270 A1* | 10/2010 | Pizzo et al. | 396/420 |
| 2014/0003802 A1* | 1/2014 | Fromm | 396/428 |
| 2014/0037281 A1* | 2/2014 | Carney | 396/421 |

* cited by examiner

CAMERA MOUNT

CROSS-REFERENCE TO RELATED APPLICATIONS

This application claims a benefit of priority under 35 U.S.C. §119 to Provisional Application No. 61/906,146, filed on Nov. 19, 2013, which is fully incorporated by reference in its entirety.

TECHNICAL FIELD

Embodiments disclose systems and methods for a camera mount. Specifically, embodiments are directed towards a camera support that may be quickly unlocked and rotated, so that the grip orientation changes from a normal hand-grip use, to an orientation that can be undergirded by the crook of the operators elbow.

BACKGROUND

Since the invention of the motion-picture camera, cinematographers have needed accessories that supported and stabilized their cameras in order to ensure sharp, controlled images. This resulted in the development of the camera tripod, camera dolly, camera jib, etc. As motion-picture cameras became smaller and lighter, artists began hand-holding their cameras, struggling to fit what is essentially a box-shaped object to the ergonomics of the human form. It is for this purpose that the shoulder-mounted camera was developed.

Today, many cameras have shrunk in size to become little more than a small box containing a sensor and storage media. Thusly, new accessories were developed to "rig" these smaller cameras to fit the mold of the shoulder-camera configuration. This accessory which adapts the camera "box" form to that which more comfortably fits the human form is typically referred to within the industry as a camera rig, or shoulder rig. Many camera rig designs have arisen that attempt to allow for the support of the camera by a user, but don't explicitly solve the problem of simultaneous control.

Currently available shoulder rig designs are modular in nature, which enables personal customization for comfort and use. Many manufacturers offer various elements that combine to form the modern shoulder rig, including shoulder pad, camera attachment plate, shoulder counter weight, rails, and handles. While the shoulder pad, rails, and counter weight all function primarily as "dumb" aspects to the overall form, they are sufficient in that they don't restrict the user from performing necessary aspects of filming. Importantly, the current industry design of the handle element has been one of a "dumb" element, with the added negative aspect of actually removing the user's ability to handle other important aspects of filming. The modern camera user needs a handle assembly that provides both weight-bearing stability and user control over such important functions as focusing or zooming of the lens.

There have been attempts at reconciling these two needs by designing handles that serve two functions simultaneously: bearing weight while also transmitting user intentions, including focus or zoom control, via a direct-linked twisting or squeezing of the handle. This design has failed because it forces the user to support weight at the same point where the nuanced movements required for quality filmmaking are taking place. It is widely understood that muscles under heavy stress (of a camera) are not as adept at small nuanced control (of focusing or zooming artistically).

Accordingly, need exists for a handle element that provides both weight-bearing stability and an arm position that leaves the user free to manipulate filming functions with finesse and ease.

SUMMARY

Embodiments described herein relate to a camera mounting systems and methods. Embodiments disclose systems and methods for a camera mount. Specifically, embodiments are directed towards a camera support that may be quickly unlocked and rotated, so that the grip orientation changes from a normal hand-grip use, to an orientation that can be undergirded by the crook of the operators elbow.

Embodiments include a handle assembly that can be configured to connect to industry standard shoulder rig elements via 15 or 18 mm rail clamp, factory rosette, or any number of accepted means.

Embodiments may include a rig mounting piece that is configured to couple with a shoulder rig or camera, a handle mounting piece that is configured to couple with the rig mounting piece, and a handle assembly.

In embodiments, the handle mounting piece and the handle assembly may be designed to be a single component.

Embodiments may include an interface between the rig mounting piece and the handle mounting piece. The interface may be configured for a single button unlock of their rotation to one another, which by their shape and orientation, results in the two pieces changing from linear to one another, to varying degrees up to 90° to one another.

In embodiments, the interface is configured to couple the rig mounting piece and handle mounting piece, to allow the handle mounting piece to be rotated on a fix, constant, pre-determined rotational plane, wherein the rotational plane is positioned at a 45° offset with respect to a longitudinal axis of the rig mounting piece. This geometric construction allows an axis of the rig mounting piece and handle mounting piece to change from in-line to perpendicular.

In embodiments, by rotating the rig mounting piece and the handle mounting piece, their configuration changes from a straight line to an "L"-shape.

In embodiments, the handle assembly may be comprised of an extension arm and a handle grip, which extends at a perpendicular angle from the central axis of the extension arm adding another "L" shape to the overall configuration. Additionally, the geometric construction of the handle mounting piece and the handle assembly is such that the handle assembly can be adjusted for length, nearer or further from the rig mounting piece.

Accordingly, embodiments are configured to allow the handle assembly to extend outwardly in a straight configuration similar to current designs. Including the handle grip extending perpendicularly, the initial state of the assembly takes on a complete shape of an "L," while a simple rotation of two pieces substantially changes the overall shape of the assembly to a shape more similar to a "Z" by the fact that that camera mount includes two 90° bends. By the nature of the two 45° plane interfaces between the rig mounting piece and the handle mounting piece, at a fixed rotational angle they may be positioned at two configurations. In a first position, the two planes may cancel each other out, creating the "L" configuration. At a second position, the two planes combine to form a 90° angle, creating the "Z" configuration.

In embodiments, the interface may be configured to be positioned at a first position and a second position. However embodiments may be configured to have a full range of motion via the rotation of the handle mounting piece.

In embodiments, in the first position, the camera mount may be configured in an "L" configuration. In the "L" configuration, the handle assembly extends from the existing shoulder rig outward and terminates in the grip handle. This configuration only allows for the camera operator's hand to hold the grip and support the shoulder rig.

In embodiments, in the second position, the camera mount may be configured in a "Z" configuration. In the "Z" configuration, an operator may have a free hand for further camera operations beyond merely supporting weight. When the handle assembly is rotated, and moved from the first position to the second position the camera mount may have an additional 90° bend or "Z"-shape forcing the handle grip downward into the camera operator's inside elbow (elbow crook or antecubital). This geometry, with a simple rotation, effectively moves the cushy, weight-bearing grip from a first position requiring full use of the operator's hand, to a second position allowing the weight of the camera to be borne by the operator's inner elbow, freeing his hand for focus adjustments and other operations.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions, or rearrangements may be made within the scope of the invention. The invention includes all such substitutions, modifications, additions or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore nonlimiting, embodiments illustrated in the drawings, wherein identical reference numerals designate the same components. Note that the features illustrated in the drawings are not necessarily drawn to scale.

DETAILED DESCRIPTION

The invention and the various features and advantageous details thereof are explained more fully with reference to the nonlimiting embodiments that are illustrated in the accompanying drawings and are detailed in the following description.

Figure 1:
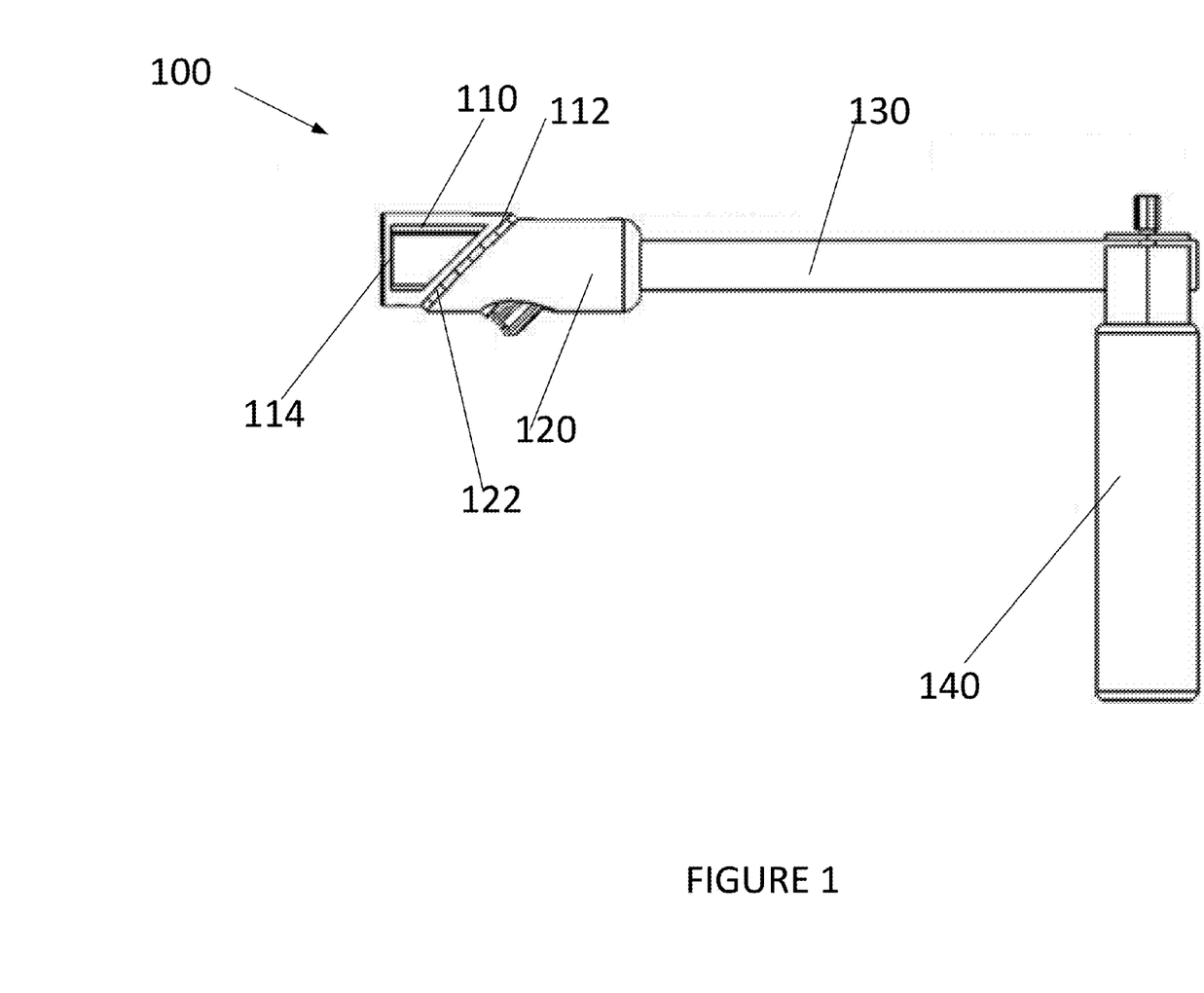
FIG. 1 depicts one embodiment of a camera mount system in a first position.

FIG. 1 depicts one embodiment of a camera mount 100. Camera mount 100 may be configured to allow an operator of a camera to secure the camera while filming. In embodiments, camera mount 100 may be configured to change configurations from a first position to a second position. FIG. 1 depicts camera mount 100 in a first position.

Camera mount 100 may include rig mounting piece 110, a handle mounting piece 120, and a handle assembly piece 130.

Rig mounting piece 110 may be configured to couple with a camera, and a shaft of rig mounting piece 110 may extend perpendicularly away from a face of the camera. Rig mounting piece 110 may include a camera mounting interface 114 and first face 112.

Camera mounting interface 114 may be positioned on a first end of rig mounting piece 110, and may include radially distributed projections, teeth, etc. (referred to herein after as "projections") surrounding a threaded bolt, such as in an existing mount on a camera. Camera mounting interface 114 may be configured to allow for a camera to be coupled to rig mounting piece 110. In embodiments, camera mounting interface 114 may include a surface that is configured to be positioned adjacent to and planar to a surface of a camera mount.

First face 112 may be positioned on a second end of rig mounting piece 110, and may include a first set of projections, wherein the first set of projections are configured to align with and interface with a second set of projections positioned on handle mounting piece 120. First face 112 may include a linear face that is angled at a first inclined plane, wherein in embodiments the first inclined plane may be angled at a 45° angle.

Handle mounting piece 120 may be configured to couple with rig mounting piece 110, wherein handle mounting piece 120 may be rotated to change the configuration of camera mount 100. Handle mounting piece 120 may include second face 122 and shaft 130.

Second face 122 may be positioned on a first end of handle mounting piece 120, and may include a second set of projections. The second set of projections may be configured to align with and interface with the first set of projections positioned on rig mounting piece 110. Second face 112 may include a linear face that is angled at a second inclined plane, wherein in embodiments the second inclined plane may be angled at 45°. In embodiments, the second inclined plane may be parallel and planar to the first inclined plane.

Furthermore, in embodiments, the first incline plane and the second inclined plane may be configured such that rig mounting piece 110 and handle mounting piece 120 form rotational planes that handle mounting piece 120 may be rotated upon, wherein the rotational plane is offset 45° from an axis of the first end of rig mounting piece 110.

Shaft 130 may be a tubular extension extending from a second end of handle mounting piece 120. In embodiments, responsive to handle mounting piece 120 being rotated, the direction of shaft 130 may correspondingly change. For example, in a first position, shaft 130 may be configured to extend in a direction parallel to a first end of rig mounting piece 110 and/or a face of the camera. In a second position, shaft 130 may be configured to extend in a direction perpendicular to the first end of rig mounting piece 110 and/or the face of the camera.

Handle assembly piece 140 may be a handle configured allow a user of camera mount 100 to secure the camera in place. In embodiments, handle assembly piece 140 may include a grip configured to receive force from a user's hand, elbow joint, shoulder, etc. based on the configuration of handle mount 100. Handle assembly piece 140 may be configured to couple with shaft 130 in a direction that is perpendicular to shaft 130 and/or at a direction at a 45° offset from first face 112 and second face 122.

Figure 2:
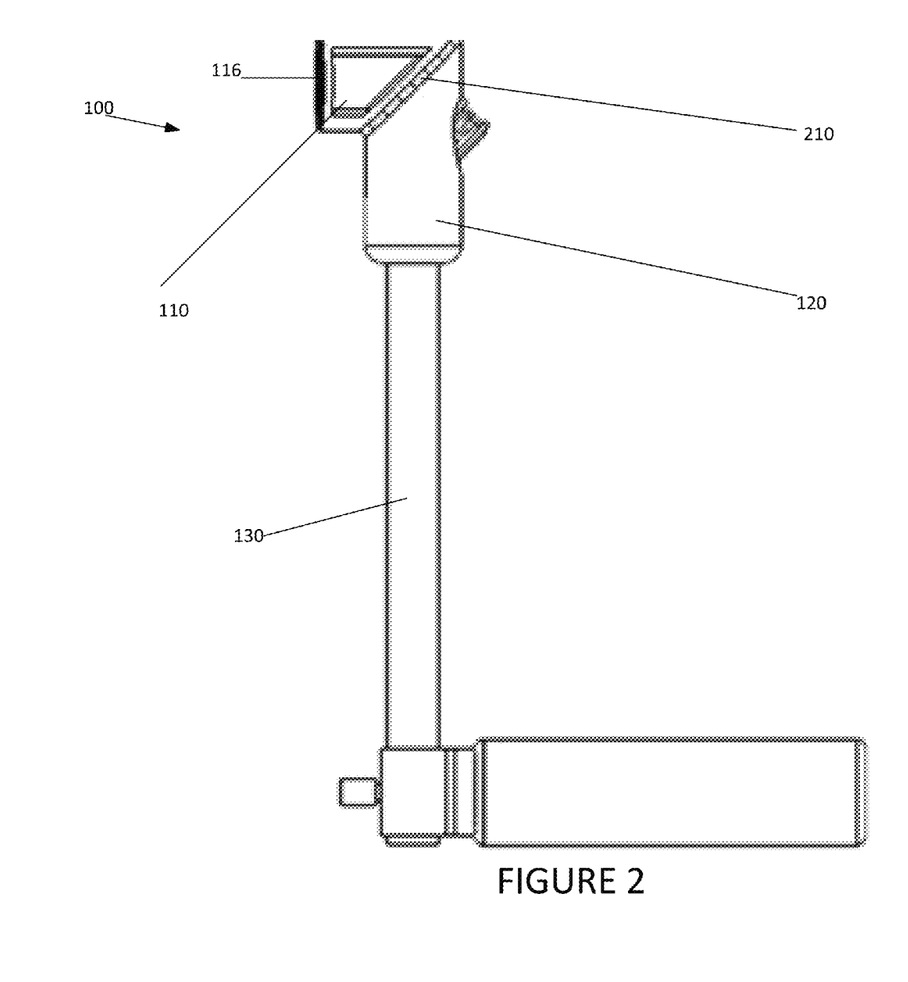
FIG. 2 depicts one embodiment of a camera mount system in a second position.

FIG. 2 depicts camera mount 100 in a second position. As depicted in FIG. 2 handle mounting piece 120 is rotated around a plane at offset 45° from first end 116 of rig mounting piece 110. By handle mounting piece 120 being configured to rotate around a plane offset 45° from first end 116 of rig mounting piece 110, handle mount 120 may change from a first position to a second position. More specifically, in the first position as depicted in FIG. 1, shaft 130 may extend in a direction parallel to a central axis of rig mounting piece 110. Whereas, in the second position as depicted in FIG. 2, shaft 130 may extend in a direction perpendicular to the central axis of rig mounting piece 110.

Accordingly, embodiments may utilize first face 112 and second face 122 that have substantially 45° faces coupled together to form a planar surface. In embodiments, the faces may be mounted to portions of what may typically be configured in a linear state. Furthermore, utilizing the first set of projections positioned on first face 112 and the second set of projections positioned on second face 122, rig mounting piece 110 and handle mounting piece 120 may be locked and unlocked. When rig mounting piece 110 and handle mounting piece 120 are locked, movement of handle mounting piece 120 may be restricted, limited, etc., whereas when rig mounting piece 110 and handle mounting piece 120 are unlocked, handle mounting piece 120 may be rotated at a 45° degree angle from a central axis of rig mounting piece 110. This 45° planar rotational configuration is very useful in the customization of a handle or support system for camera operation.

Responsive to handle mounting piece 120 being rotated, a central axis of handle mounting piece 120 may change from a linear configuration with respect to a central axis of rig mounting piece 110 to a perpendicular configuration with respect to the central axis of rig mounting piece 110.

Figure 3:
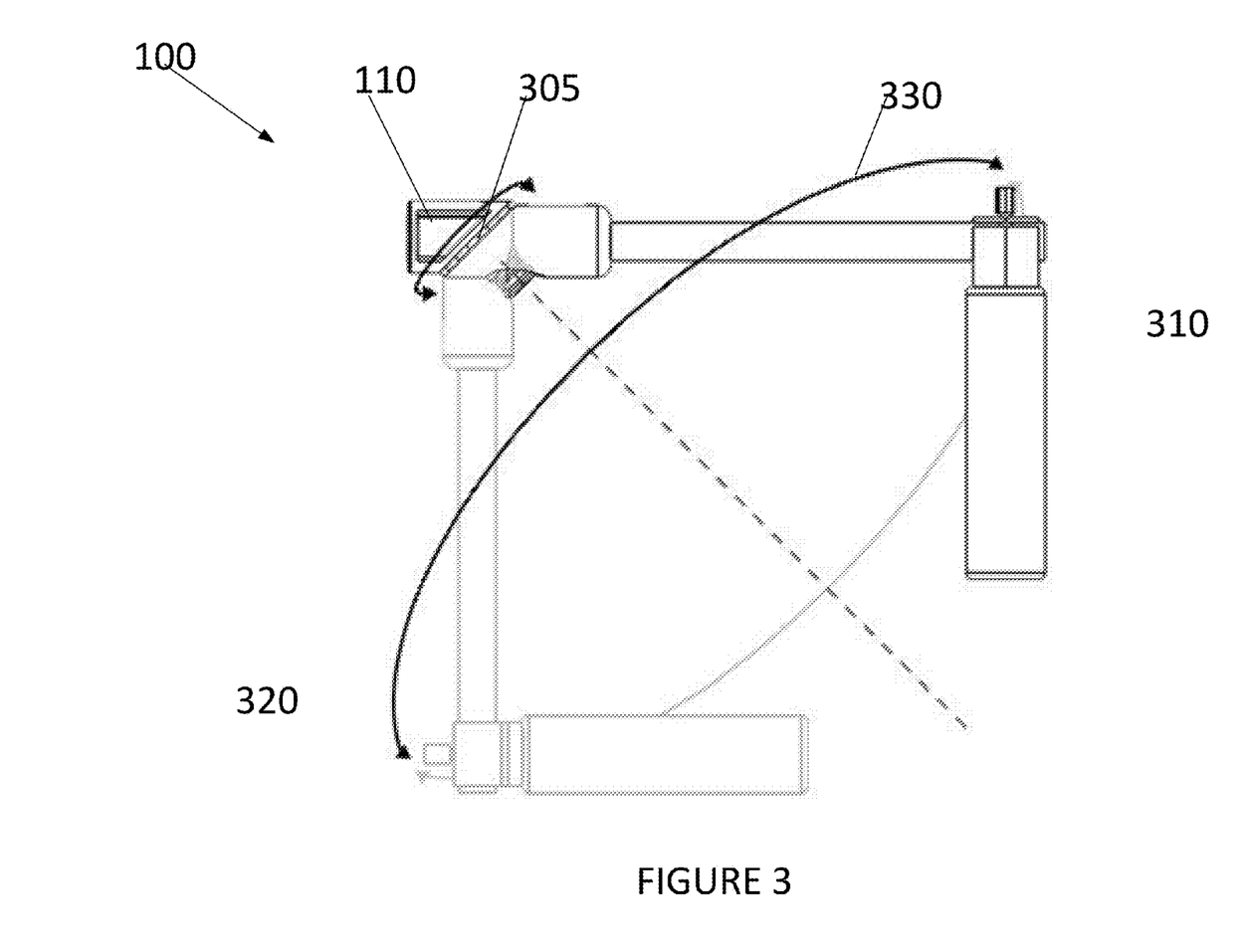
FIG. 3 depicts one embodiment of a camera mount system rotating between a first position and a second position.

FIG. 3 depicts one embodiment of camera mount 100 being rotated between first position 310 and second position 320, wherein the shaft of the handle mounting piece travels along path 330.

As depicted in FIG. 3, rig mounting piece 110 may be at a fixed position and handle mounting piece 120 may be configured to rotate along the fixed rotational plane 305, which is positioned between rig mounting piece 110 and handle mounting piece 120.

Figure 4A:
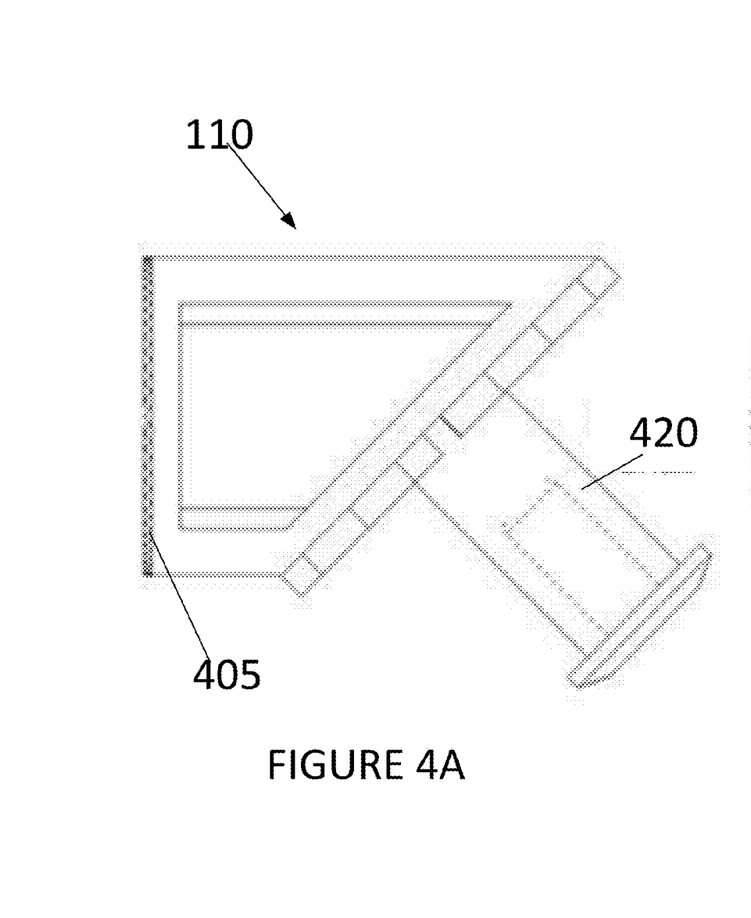
FIG. 4A depicts one embodiment of a side view of a camera mount piece.
Figure 4B:
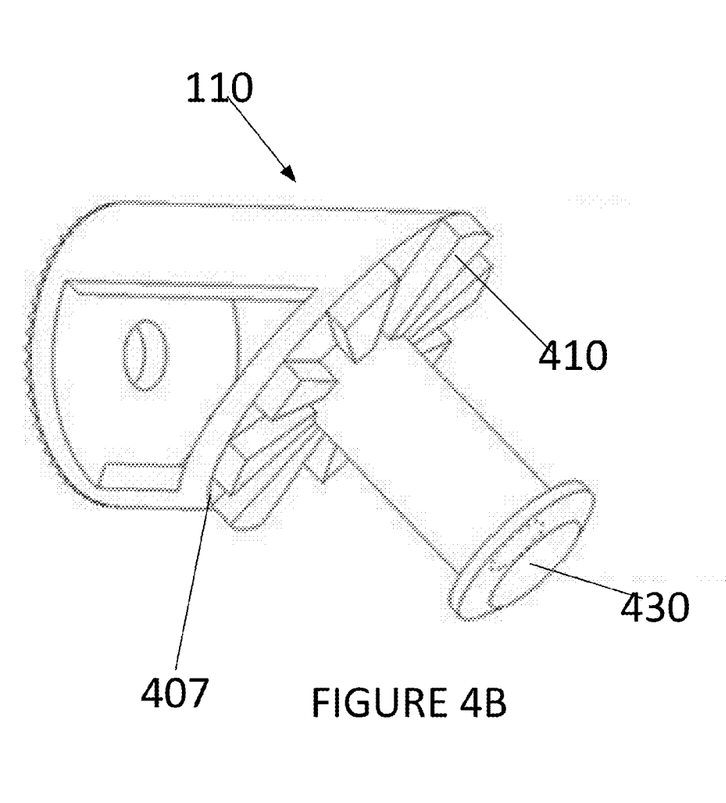
FIG. 4B depicts one embodiment of a perspective view of a camera mount piece.

FIGS. 4A and 4B depict one embodiment of rig mounting piece 110. Rig mounting piece 110 may include first end 405 and second end 407. First end 405 may be configured to couple with a camera chassis or rig, and second end 407 may be configured to couple with a handle mounting piece 120.

Second end 407 may be positioned at a first inclined plane, wherein the first inclined plane may be positioned at a 45° offset with respect to a face of first end 405. Second end 407 may include a first set of projections 410, wherein the first set of projections 410 are configured to interface with a second set of projections positioned on the handle mounting piece 120 to couple rig mounting piece 110 and handle mounting piece 120. When handle mounting piece 120 is coupled to rig mounting piece 110, each of the projections within the first set of projections 410 may be inserted into corresponding grooves within a second inclined plane on the handle mounting piece 120, and vice versa.

In embodiments, second end 407 may include rotational shaft 420. Rotational shaft 420 may be configured to protrude away from second end 407 in a direction perpendicular to second end 407. Rotational shaft 420 may include a button interface 430. Responsive to the button interface 430 receiving force, handle mounting piece 120 may be able to move away from second end 407 and be rotated.

Figure 5A:
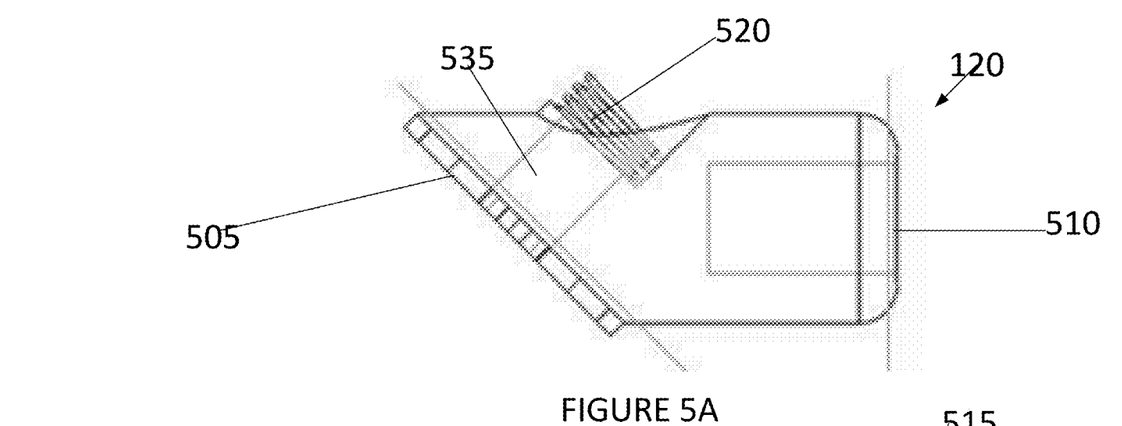
FIG. 5A depicts one embodiment of a side view of a handle mount piece.
Figure 5B:
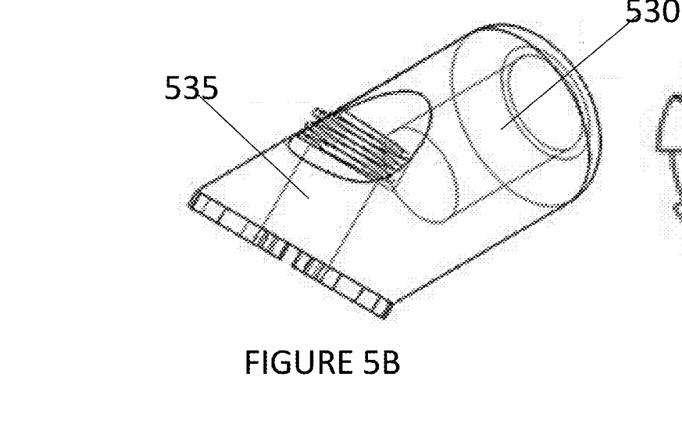
FIG. 5B depicts one embodiment of an isometric view of a handle mount piece.
Figure 5C:
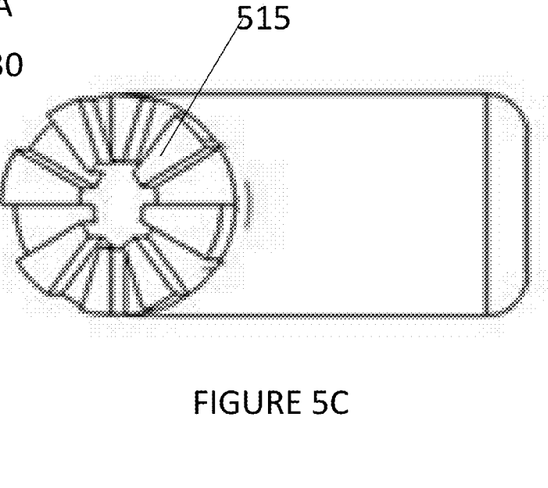
FIG. 5C depicts one embodiment of a bottom view of a handle mount piece.

FIGS. 5A, 5B, and 5C depict various views of one embodiment of handle mounting piece 120. Handle mounting piece 120 may have a first end 505 and second end 510.

First end 505 of handle mounting piece 120 may be configured to be placed adjacent to second end 407 of rig mounting piece 110 to form a fixed rotational plane. First end 505 may be positioned at a second inclined plane, wherein the first inclined plane and the second inclined plane are configured to be subtracted to form a 180° angle between the longitudinal axis's of rig mounting piece 110 and handle mounting piece 120, or be summed to form a 90° angle between the longitudinal axis's of rig mounting piece 110 and handle mounting piece 120. In embodiments, a second set of projections 515 may be configured to be positioned on first end 505.

When handle mounting piece 120 is coupled to rig mounting piece 110, each of the projections within the second set of projections 515 may be inserted into corresponding grooves within the first set of projections.

In embodiments, an orifice 535 may be positioned on first end 505 and extend through a body of handle mounting piece 120. Orifice 535 may be positioned at a perpendicular angle with respect to a face of first end 505. In embodiments, rotational shaft 420 may be configured to extend through orifice 535, such that a top surface of rotational shaft 520 is positioned adjacent to the top of orifice 535.

Positioned on an end of orifice 535 may be a compression spring 520. Spring 520 may be configured to interface with rotational shaft 420 to compress and stretch. Responsive to spring 520 being stretched, the first set of projections 410 and the second set of projections 515 may be locked in alignment, such that handle mounting piece 120 may not be rotated. Responsive to button 430 being pressed, spring 520 may be compressed. When spring 520 is compressed, the first set of projections 410 and second set of projections 535 may be decoupled, such that first face 505 of handle mounting piece 120 may not be positioned adjacent to second end 407 of rig mounting piece 110. Responsive to the first set of projections and the second set of projections being decoupled, handle mounting piece 120 may be rotated along the fixed rotational plane between the first position and second position.

Second end 510 of handle mounting piece 120 may be configured to couple with a shaft 130, wherein the shaft may be inserted into a shaft orifice 530. The shaft orifice 530 may extend through a portion of handle mounting piece 120 in a direction along the longitudinal axis of handle mounting piece 120.

Figure 6A:
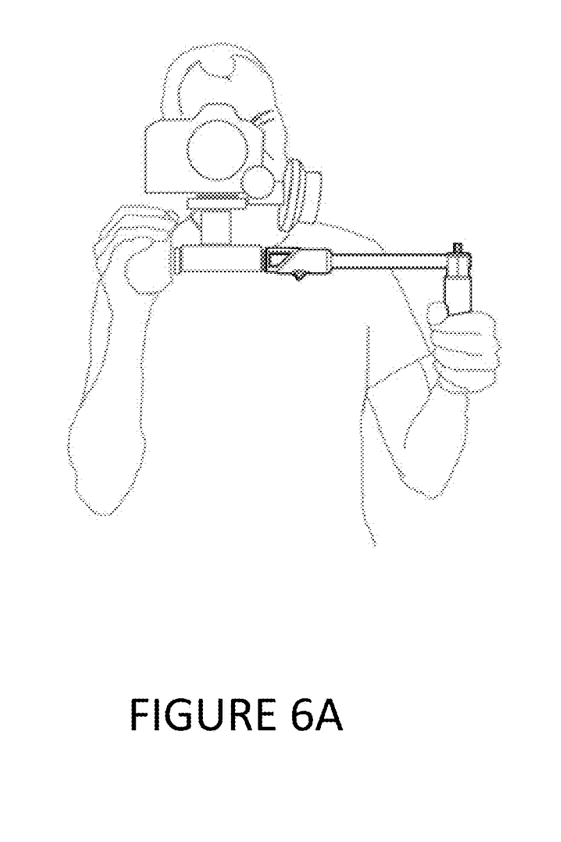
FIG. 6A depicts one embodiment of a front view of the camera mounting system being in the first position.
Figure 6B:
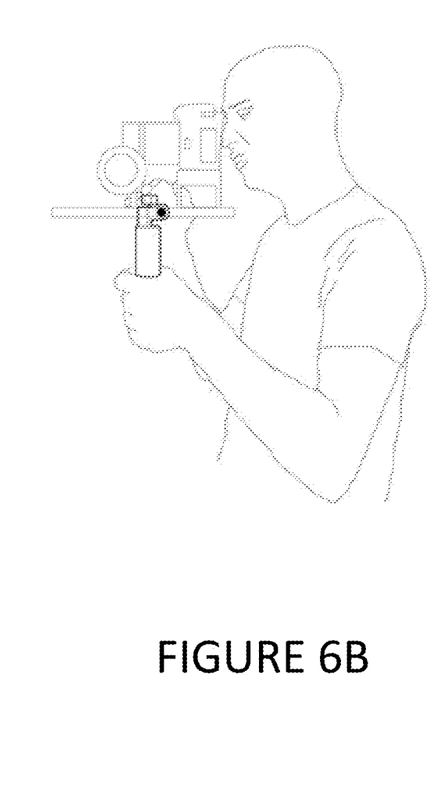
FIG. 6B depicts one embodiment of a side view of the camera mounting system being in the first position.

FIGS. 6A and 6B depict various views of camera mount 100 being in the first position. As depicted in FIGS. 6A and 6B, when camera mount 100 is in the first position, the shaft of the handle mounting piece may extend away from the camera mount, such that the shaft extends along the same axis as the longitudinal axis of the rig mounting piece and the handle mounting piece.

Figure 7:
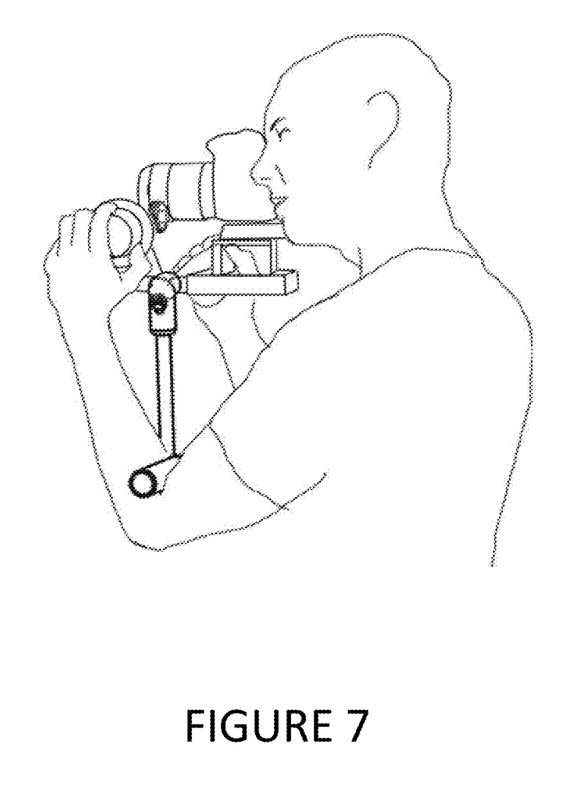
FIG. 7 depicts one embodiment of a perspective view of the camera mounting system being in the second position.

FIG. 7 depicts a view of camera mount 100 being in the second position. Responsive to the handle mounting piece being rotated along the fixed rotational plane, the longitudinal axis of the handle mounting piece may be perpendicular to the longitudinal axis of the rig mounting piece.

In the foregoing specification, embodiments have been described with reference to specific embodiments. However, one of ordinary skill in the art appreciates that various modifications and changes can be made without departing from the scope of the invention. Accordingly, the specification and figures are to be regarded in an illustrative rather than a restrictive sense, and all such modifications are intended to be included within the scope of the invention.

Although the invention has been described with respect to specific embodiments thereof, these embodiments are merely illustrative, and are thus not restrictive of the invention. The description herein of illustrated embodiments of the invention is not intended to be exhaustive or to limit the invention to the precise forms disclosed herein (in particular, the inclusion of any particular embodiment, feature, or function is not intended to limit the scope of the invention to such embodiment, feature, or function).

Rather, the description is intended to describe illustrative embodiments, features and functions in order to provide a person of ordinary skill in the art context to understand the invention without limiting the invention to any particularly described embodiment, feature, or function. While specific embodiments of, and examples for, the invention are described herein for illustrative purposes only, various equivalent modifications are possible within the spirit and scope of the invention, as those skilled in the relevant art will recognize and appreciate.

As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes, and substitutions are intended in the foregoing disclosures. It will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment," "an embodiment," "a specific embodiment" or similar terminology means that a particular feature, structure, or characteristic described in connection with the embodiment is included in at least one embodiment and may not necessarily be present in all embodiments. Thus, respective appearances of the phrases "in one embodiment," "in an embodiment," or "in a specific embodiment" or similar terminology in various places throughout this specification are not necessarily referring to the same embodiment.

Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

Furthermore, the term "or" as used herein is generally intended to mean "and/or" unless otherwise indicated. As used herein, a term preceded by "a" or "an" (and "the" when antecedent basis is "a" or "an") includes both singular and plural of such term (i.e., that the reference "a" or "an" clearly indicates only the singular or only the plural). Also, as used in the description herein, the meaning of "in" includes "in" and "on" unless the context clearly dictates otherwise.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed is:

1. A camera mount system comprising:
   a rig mounting piece configured to couple with a camera mount, the rig mounting piece including a first face, wherein the first face is positioned at a first inclined plane;
   a handle mounting piece configured to couple with the rig mounting piece, wherein a second face is positioned at a second inclined plane, the first inclined plane and the second inclined plane forming a rotational plane, wherein the rotational plane is positioned at a fixed 45° offset from a longitudinal axis of the rig mounting piece;
   a first set of projections positioned on the first face; and
   a second set of projections positioned on the second face, wherein the first set of projections are configured to align with the second set of projections.

2. The camera mount system of claim 1, further comprising:
   a rotation shaft positioned on the first face, the rotation shaft extending away from the first face in a direction perpendicular to the first face; and
   a rotation adjustment orifice positioned on the second face, the rotation adjustment orifice being an orifice extending through the handle mounting piece at a direction perpendicular to the second face.

3. The camera mount system of claim 2, wherein the rotation adjustment orifice includes a spring, the spring being configured to compress and stretch.

4. The camera mount system of claim 3, wherein responsive to the spring expanding the first set of projections and the second set of projections are locked in alignment, and the first face is positioned adjacent to the second face.

5. The camera mount system of claim 3, further including:
   a button interface positioned on the rotation shaft, the button interface configured to compress the spring responsive to receiving force, wherein when the spring is compressed the first set of projections and the second set of projections are no longer locked in alignment.

6. The camera mount system of claim 1, wherein the handle mounting piece is configured to rotate between a first position and a second position while the first inclined plane and the second incline plane maintain the rotational plane.

7. The camera mount system of claim 1, wherein the handle mounting piece includes a first end and a second end, the second inclined plane being positioned on the first end of the handle mounting piece, and a shaft is coupled with the second end of the handle mounting piece, the shaft extending away from the handle mounting piece in a direction parallel to a longitudinal axis of the handle mounting piece.

8. The camera mount system of claim 7, wherein in the first position the second end of the handle mounting piece is parallel to a face of the camera mount.

9. The camera mount system of claim 7, wherein in the second position the second end of the handle mounting piece is perpendicular to a face of the camera mount.

10. The camera mount system of claim 1, wherein when the first set of projections are aligned with the second set of projections the first inclined plane is positioned adjacent to the second inclined plane.

11. A method for coupling a camera to a mount, the method comprising:
coupling a rig mounting piece to a camera mount, the camera attachment including a first face positioned at a first inclined plane;
coupling a handle mounting piece with the rig mounting piece, the handle mounting piece having a second face positioned at a second inclined plane, the first inclined plane and the second inclined plane forming a rotational plane, wherein the rotational plane is positioned at a fixed 45° offset from a longitudinal axis of the rig mounting piece;
aligning a first set of projections positioned on the first face with a second set of projections positioned on the second face when the handle mounting piece is coupled with the rig mounting piece.

12. The method of claim 11, further comprising:
inserting a rotation shaft positioned on the first face through a rotation adjustment orifice positioned on the second face, wherein the rotation shaft extends away from the first face in a direction perpendicular to the first face and the rotation adjustment orifice being an orifice extending through the handle mounting piece at a direction perpendicular to the second face.

13. The method of claim 12, further comprising:
compressing and expanding a spring positioned within the rotation adjustment orifice.

14. The method of claim 13, wherein responsive to the spring being stretched the first set of projections and the second set of projections are locked in alignment, and the first face is positioned adjacent to the second face.

15. The method of claim 13, further comprising:
applying force to a button interface positioned on the rotation shaft;
compressing the spring responsive to the force being applied to the button interface;
disengaging the first set of projections and the second set of projections responsive to compressing the spring.

16. The method of claim 11, further comprising:
rotating the handle mounting piece between a first position and a second position while the first inclined plane and the second incline plane maintain the rotational plane.

17. The method of claim 11, wherein the handle mounting piece includes a first end and a second end, the second inclined plane being positioned on the first end of the handle mounting piece, and a shaft is coupled with the second end of the handle mounting piece, the shaft extending away from the handle mounting piece in a direction parallel to the longitudinal axis of the handle mounting piece.

18. The method of claim 17, wherein in the first position the second end of the handle mounting piece is parallel to a face of the camera mount.

19. The method of claim 17, wherein in the second position the second end of the handle mounting piece is perpendicular to a face of the camera mount.

20. The method of claim 11, wherein when the first set of projections are aligned with the second set of projections the first inclined plane is positioned adjacent to the second inclined plane.

* * * * *